US012631270B2

(12) United States Patent (10) Patent No.: US 12,631,270 B2
Lippka (45) Date of Patent: May 19, 2026

(54) PIPE COUPLING GASKET

(71) Applicant: Tyco Fire Products LP, Lansdale, PA (US)

(72) Inventor: Sandra M. Lippka, Warwick, RI (US)

(73) Assignee: Tyco Fire Products LP, Cranston, RI (US)

( * ) Notice: Subject to any disclaimer, the term of this patent is extended or adjusted under 35 U.S.C. 154(b) by 565 days.

(21) Appl. No.: 17/918,082

(22) PCT Filed: Jun. 14, 2021

(86) PCT No.: PCT/IB2021/055227
§ 371 (c)(1),
(2) Date: Oct. 10, 2022

(87) PCT Pub. No.: WO2021/255623
PCT Pub. Date: Dec. 23, 2021

(65) Prior Publication Data
US 2023/0160508 A1 May 25, 2023

Related U.S. Application Data

(60) Provisional application No. 63/040,157, filed on Jun. 17, 2020.

(51) Int. Cl.
*F16L 17/06* (2006.01)
*F16L 17/04* (2006.01)
(Continued)

(52) U.S. Cl.
CPC .............. *F16L 17/06* (2013.01); *F16L 17/04* (2013.01); *F16L 23/22* (2013.01); *F16L 23/08* (2013.01)

(58) Field of Classification Search
CPC . F16L 23/22; F16L 23/08; F16L 17/04; F16L 21/025; F16L 21/08; F16L 17/06
See application file for complete search history.

(56) References Cited

U.S. PATENT DOCUMENTS 4,726,611 A * 2/1988 Sauer ...................... F16L 17/04
285/236
5,758,906 A * 6/1998 Carlstrom ............... F16L 47/08
285/423
(Continued)

FOREIGN PATENT DOCUMENTS

KR 10-2014-0137153 A 12/2014
WO WO-2009/045525 A2 4/2009
WO WO-2018/222867 A1 12/2018

OTHER PUBLICATIONS

Korean Intellectual Property Office as International Searching Authority; International Search Report and Written Opinion; PCT/IB2021/ 055227; Sep. 17, 2021; 10 pages.

*Primary Examiner* — James M Hewitt, II
(74) *Attorney, Agent, or Firm* — Foley & Lardner LLP

(57) ABSTRACT

A gasket includes a base extending circumferentially about a gasket axis, a central flange, a first arm, and a second arm. The first arm includes a first arm portion extending from the gasket base to a first radial axis and a second arm portion defining a first surface at a first angle and a second surface at a second angle, the second angle greater than the first angle. The second arm includes a third arm portion extending from the gasket base to a second radial axis that is perpendicular to the gasket axis and a fourth arm portion defining a third surface at a third angle and a fourth surface at a fourth angle, the fourth angle greater than the first angle, the fourth surface further from the third arm portion than the third surface.

20 Claims, 6 Drawing Sheets

(51) Int. Cl.
  _F16L 23/22_    (2006.01)
  _F16L 23/08_    (2006.01)

(56)                References Cited

U.S. PATENT DOCUMENTS

| | | | | |
|---|---|---|---|---|
| 6,312,025 | B1 * | 11/2001 | Wolfsdorf | F16L 17/02 |
| | | | | 285/104 |
| 7,401,819 | B2 | 7/2008 | Gibb et al. | |
| 7,988,207 | B2 * | 8/2011 | Dole | F16L 17/04 |
| | | | | 285/112 |
| 9,511,248 | B2 | 12/2016 | Szentimrey et al. | |
| 9,726,310 | B2 | 8/2017 | Gibb et al. | |
| 10,047,885 | B2 | 8/2018 | Vandal et al. | |
| 10,578,234 | B2 * | 3/2020 | Bowman | F16L 17/04 |
| 2007/0040336 | A1 | 2/2007 | Sun et al. | |
| 2009/0146417 | A1 | 6/2009 | Lippka et al. | |
| 2010/0320756 | A1 | 12/2010 | Gibb et al. | |
| 2011/0204582 | A1 | 8/2011 | Lippka et al. | |
| 2012/0248767 | A1 | 10/2012 | Lippka | |
| 2012/0280494 | A1 | 11/2012 | Vandal et al. | |
| 2020/0088330 | A1 | 3/2020 | Lippka | |

* cited by examiner

PIPE COUPLING GASKET

CROSS-REFERENCE TO RELATED APPLICATIONS

The present application claims the benefit of priority to U.S. Provisional Application No. 63/040,157, filed Jun. 17, 2020, the disclosure of which is incorporated herein by reference in its entirety.

BACKGROUND

Gaskets can be used in pipe installations to seal two separate pipe ends that connect in a pipe fitting. Gaskets can be stretched over the end of the pipe during installation, which can be difficult and time consuming. The gaskets can be difficult to install, such as when the pipe is not axially and radially aligned with the gasket.

SUMMARY

At least one aspect relates to a gasket. The gasket includes an annular gasket base extending circumferentially about a gasket axis, a central flange, a first arm, and a second arm. The central flange extends from the gasket base towards the gasket axis. The first arm includes a first arm portion and a second arm portion. The first arm portion extends from the gasket base to a first radial axis that is perpendicular to the gasket axis. The second arm portion extends from the first arm portion and tapers inward towards the central flange relative to the first radial axis. The second arm portion defines a first surface at a first angle relative to the first radial axis and a second surface at a second angle relative to the first radial axis. The second angle is greater than the first angle, and the second surface is further from the first arm portion than the first surface. The second arm includes a third arm portion and a fourth arm portion. The third arm portion extends from the gasket base to a second radial axis that is perpendicular to the gasket axis. The fourth arm portion extends from the third arm portion and tapers inward towards the central flange relative to the second radial axis. The fourth arm portion defines a third surface at a third angle relative to the second radial axis and a fourth surface at a fourth angle relative to the second radial axis. The fourth angle is greater than the first angle, and the fourth surface is further from the third arm portion than the third surface.

At least one aspect relates to a pipe coupling. The pipe coupling includes a housing defining a channel, and a gasket. The gasket includes an annular gasket base extending circumferentially about a gasket axis, a central flange, a first arm, and a second arm. The central flange extends from the gasket base towards the gasket axis. The first arm includes a first arm portion and a second arm portion. The first arm portion extends from the gasket base to a first radial axis that is perpendicular to the gasket axis. The second arm portion extends from the first arm portion and inward towards the central flange relative to the first radial axis. The second arm portion defines a first surface at a first angle relative to the first radial axis and a second surface at a second angle relative to the first radial axis. The second angle is greater than the first angle, and the second surface is further from the first arm portion than the first surface. The second arm includes a third arm portion and a fourth arm portion. The third arm portion extends from the gasket base to a second radial axis that is perpendicular to the gasket axis. The fourth arm portion extends from the third arm portion and inward towards the central flange relative to the second radial axis. The fourth arm portion defines a third surface at a third angle relative to the second radial axis and a fourth surface at a fourth angle relative to the second radial axis. The fourth angle is greater than the first angle, and the fourth surface is further from the third arm portion than the third surface.

At least one aspect relates to a gasket. The gasket includes an annular gasket base extending circumferentially about a gasket axis, a first arm, and a second arm. The central flange extends from the gasket base towards the gasket axis. The first arm includes a first arm portion and a second arm portion. The first arm portion extends from the gasket base to a first radial axis that is perpendicular to the gasket axis. The second arm portion extends from the first arm portion and tapers inward from the first radial axis. The second arm portion defines a first surface at a first angle relative to the first radial axis and a second surface at a second angle relative to the first radial axis. The second angle is greater than the first angle, and the second surface is further from the first arm portion than the first surface. The second arm includes a third arm portion and a fourth arm portion. The third arm portion extends from the gasket base to a second radial axis that is perpendicular to the gasket axis. The fourth arm portion extends from the third arm portion and tapers inward from the second radial axis. The fourth arm portion defines a third surface at a third angle relative to the second radial axis and a fourth surface at a fourth angle relative to the second radial axis. The fourth angle is greater than the first angle, and the fourth surface is further from the third arm portion than the third surface.

BRIEF DESCRIPTION OF THE DRAWINGS

The accompanying drawings, which are incorporated herein and constitute part of this specification, illustrate exemplary embodiments of the present disclosure, and together, with the general description given above and the detailed description given below, serve to explain the features of the present disclosure.

DETAILED DESCRIPTION

The present disclosure relates generally to the field of pipe fittings. More particularly, the present disclosure relates to systems and methods of a quick install gasket. Gasket installation can be difficult to perform, such as if the gasket is not aligned with the pipe (e.g., radially aligned and axially aligned), including if the gasket is shaped to be stretched over the pipe or relatively larger than the pipe (yet still close fitting to the pipe diameter), which can increase installation times or reduce the efficacy of the sealing enabled by the gasket. Systems and methods in accordance with the present solution can enable a gasket to be more easily installed even if not properly aligned with the pipe, such as by including inwardly tapering arm portions to help guide the pipe into the proper position.

A gasket can include an annular gasket base extending circumferentially about a gasket axis, a central flange, a first arm, and a second arm. The central flange extends from the gasket base towards the gasket axis. The first arm includes a first arm portion and a second arm portion. The first arm portion extends from the gasket base to a first radial axis that is perpendicular to the gasket axis. The second arm portion extends from the first arm portion and inward towards the central flange relative to the first radial axis. The second arm portion defines a first surface at a first angle relative to the first radial axis and a second surface at a second angle relative to the first radial axis. The second angle is greater than the first angle, and the second surface is further from the first arm portion than the first surface. The second arm includes a third arm portion and a fourth arm portion. The third arm portion extends from the gasket base to a second radial axis that is perpendicular to the gasket axis. The fourth arm portion extends from the first arm portion and inward towards the central flange relative to the second radial axis. The fourth arm portion defines a third surface at a third angle relative to the second radial axis and a fourth surface at a fourth angle relative to the second radial axis. The fourth angle is greater than the first angle, and the fourth surface is further from the third arm portion than the third surface. For example, the first and second surfaces of the second arm portion and fourth arm portion can each taper inward from the respective radial axes towards the central flange and the gasket axis, enabling the gasket to help guide a pipe into proper position even if not properly radially or axially aligned.

Figure 1:
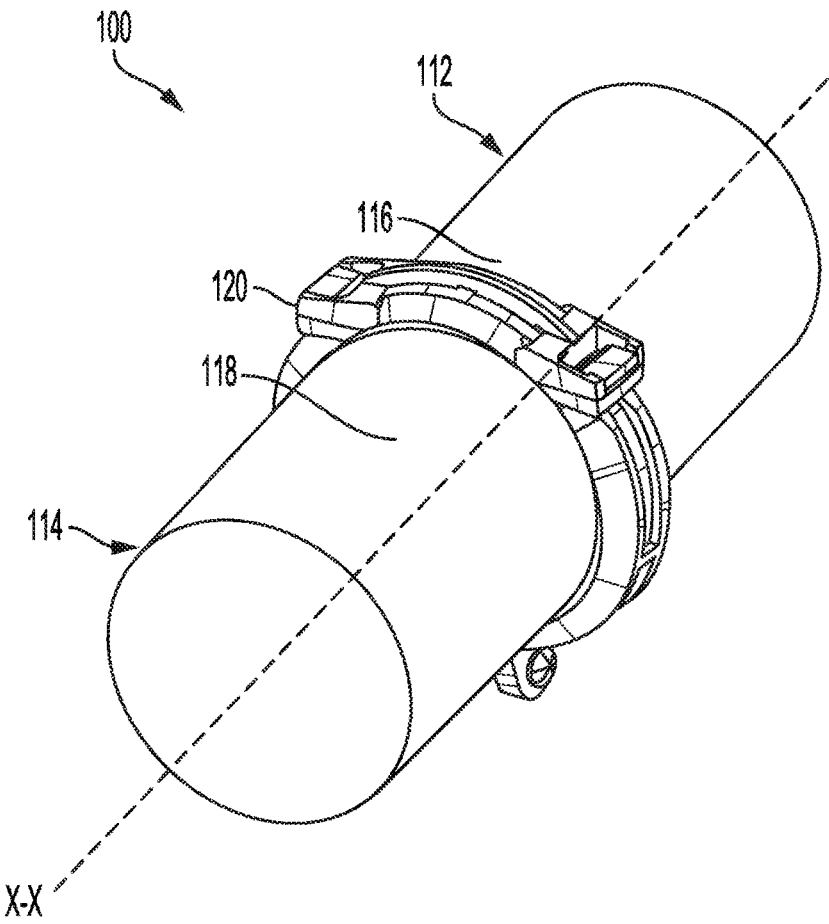
FIG. 1 is a perspective view of a pipe coupling formed with a housing and a gasket.

FIG. 1 depicts a pipe coupling 100 forming a fluidic seal between two adjacent pipes 112, 114. The pipe coupling 100 can join two pipe ends 116, 118 in an axial alignment about a gasket axis X-X, for example. The pipe ends 116, 118 can be of any fluid carrying structure, such as for example, the end of a pipe 112, 114, a pipe fitting (not shown), valve (not shown), or a fire protection sprinkler (not shown).

Figure 2:
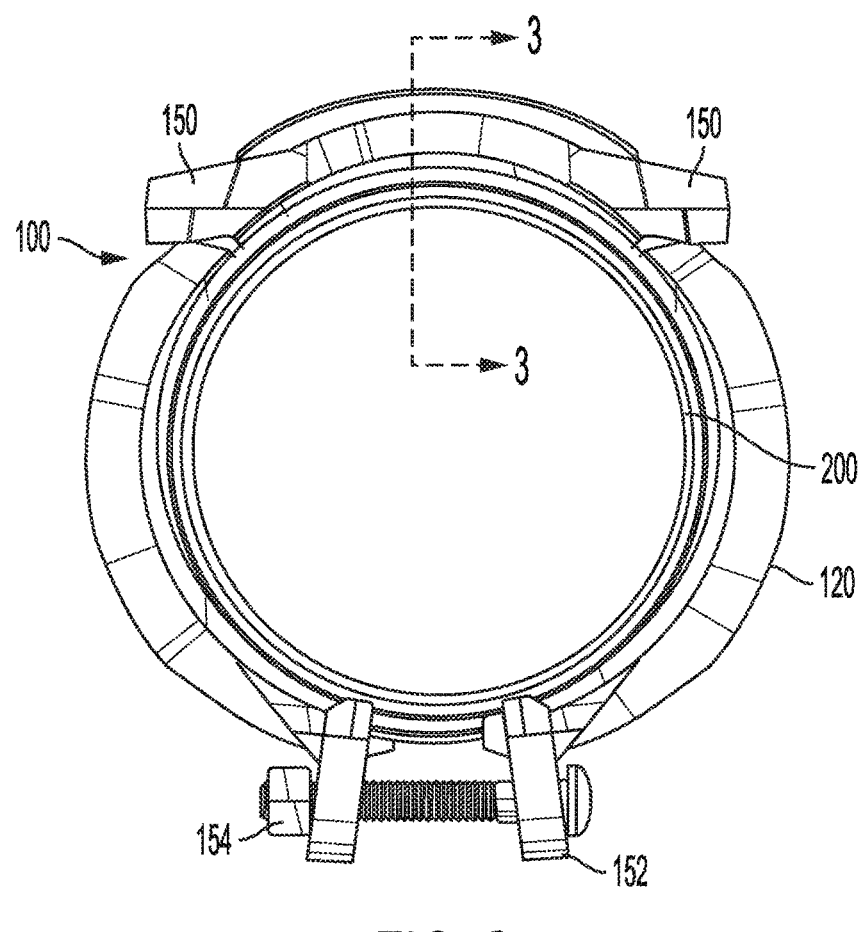
FIG. 2 is a front view of a pipe coupling depicting the internal components of the pipe coupling prior to being tightened around two pipes.
Figure 3:
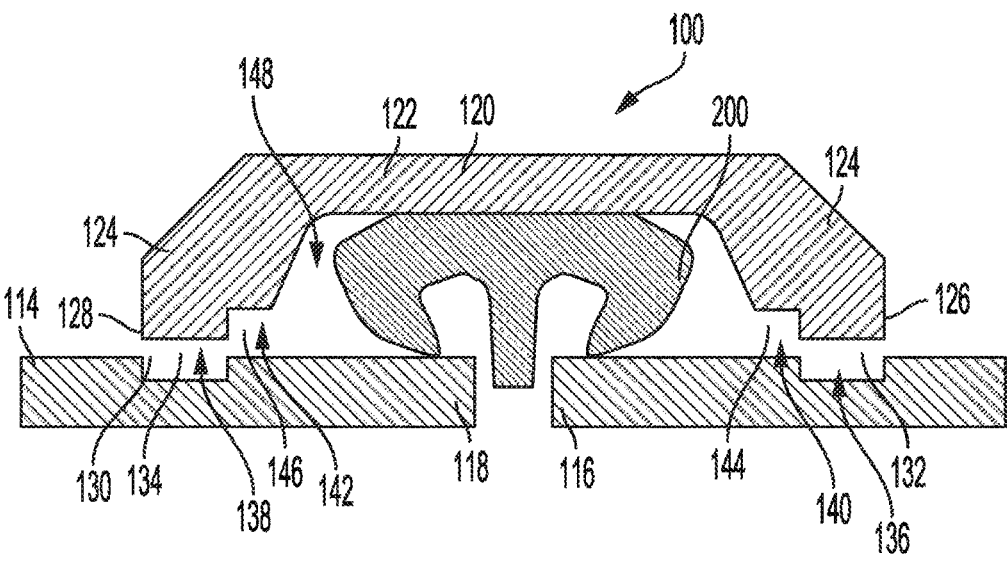
FIG. 3 is a partial cross-sectional view of a pipe coupling.

The pipe coupling 100 includes a housing 120 and a gasket 200 disposed within the housing 120. As depicted in FIGS. 2 and 3, the housing can have an annular body 122. Chamfers 124 can be formed into each axial end 126, 128 of the housing body 122, and can extend circumferentially about the housing 120. The housing body 122 can include an inner wall 130 having a tiered structure adapted to engage pipes 112, 114. For example, a cylindrical groove engaging wall 132, 134 can be formed at each axial end 126, 128 of the housing 120. Each groove engaging wall 132, 134 can have a geometry complimentary to rolled surface discontinuities 136, 138 formed in the pipes 112, 114, so that each groove engaging wall 132, 134 can be received within and engage with the surface discontinuities 136, 138 to help form a pressure resistant joint between the pipes 112, 114. Notches 140, 142 formed radially outward (e.g., away from the gasket axis X-X, etc.) and axially inward from each groove engaging wall 132, 134 can define circumferential notch walls 144, 146. The circumferential notch walls 144, 146 can engage the nominal outer diameter of the pipes 112, 114, so that when the housing 120 is received around two pipes 112, 114, the groove engaging walls 132, 134 contact the pipes 112, 114 (while the notch walls 144, 146 may or may not contact the pipes 112, 114). A channel 148 can be formed axially inward and radially outward from the notch walls 144, 146 to receive and compress the gasket 200, as explained below. The housing 120 can also include at least one locking mechanism 150. The locking mechanism 150 secures a first half to a second half of the annular body 122. The housing 120 can include protrusions 152, which can receive a fastener 154 (e.g., via openings defined in the protrusions 152). The protrusions 152 can be positioned opposite the locking mechanism 150. The fastener 154 can be rotated to decrease an inner diameter of the housing 120 and compress components within the inner diameter.

The gasket 200 can be compressed between and around the pipe ends 116, 118 to form a fluidic seal between the pipes 112, 114. FIG. 2 depicts the gasket 200 having an annular gasket base 202 extending circumferentially about the gasket axis X-X. In the pipe coupling 100 depicted in FIG. 1, the gasket axis X-X may coincide with the longitudinal axis of the housing 120 and/or the pipes 112, 114.

Figure 4:
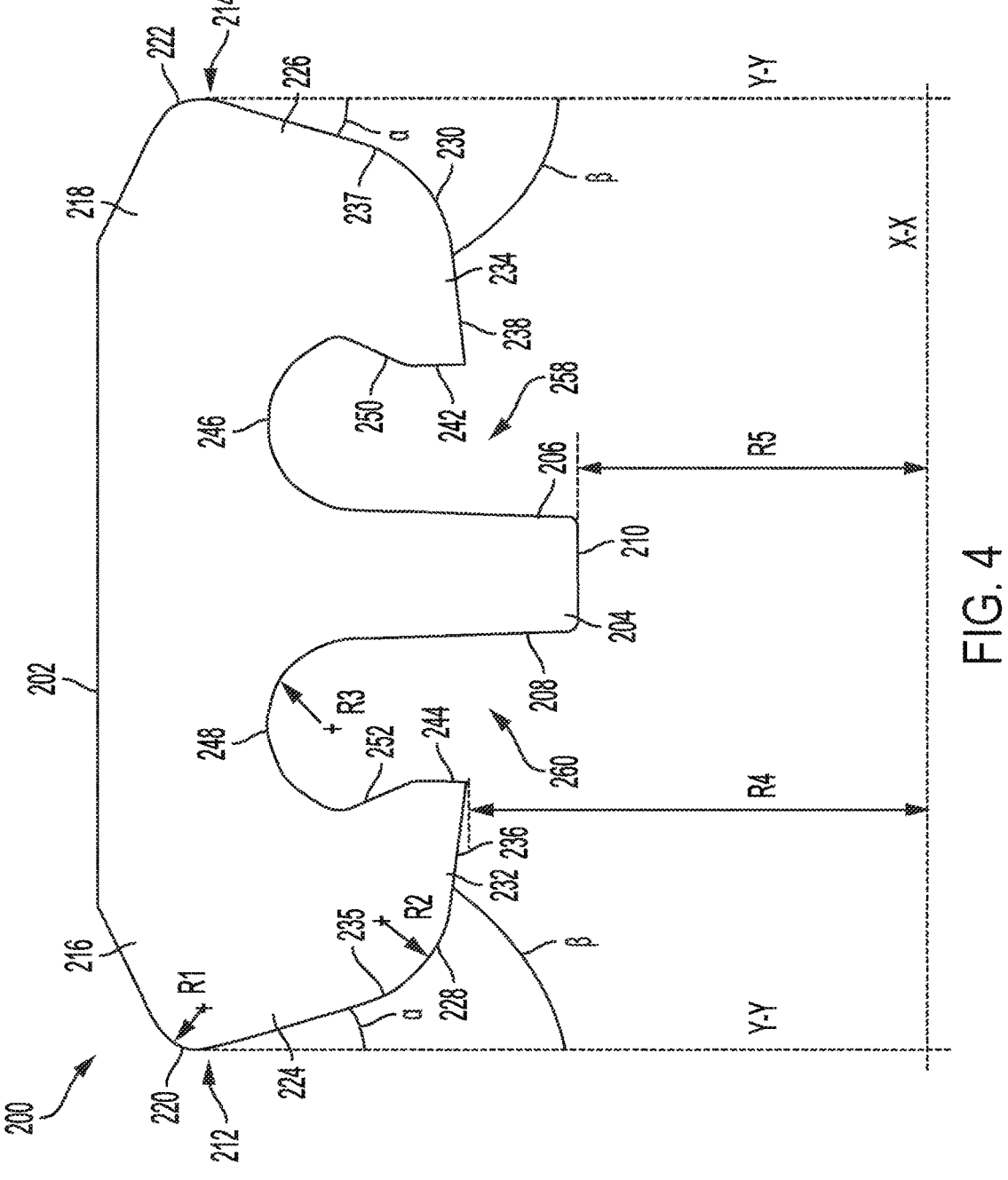
FIG. 4 is a cross-sectional view of a gasket of a pipe coupling.

FIG. 4 depicts features of the geometry of the gasket 200. A central flange 204 can radially and inwardly away from the gasket base 202 to an apex 210 (e.g., apex surface) that is towards the gasket axis X-X; for example, the central flange 204 can extend towards the pipes 112, 114 and past an outer diameter of the pipes 112, 114. The central flange 204 can have a rectangular cross-section (e.g., the cross-section can have sides that are slightly tapered, which can facilitate releasing the gasket 200 from a mold during manufacturing) defined by a first flange wall 206, a second flange wall 208 opposite the first flange wall 206, and the apex 210. The apex 210 is positioned at a point closest to the gasket axis X-X.

Arms 212, 214 extend away from the gasket base 202. The first arm 212 is spaced apart from the central flange 204 and extends radially and inwardly away from the gasket base 202 toward the gasket axis X-X. Similarly, the second arm 214 is spaced apart from the central flange 204 and extends radially and inwardly away from the gasket base toward the gasket axis X-X. The central flange 204 can be positioned between the first arm 212 and the second arm 214. The arms 212, 214 can be symmetrical about the central flange 204. Each arm 212, 214 can define a respective cavity between the central flange 204 and the arm 212, 214. The arms 212, 214 can extend continuously from one another (e.g., the central flange 204 may not be provided or may be relatively short such that the flange 204 extends at most by a minimal amount towards the gasket axis X-X from the gasket base 202).

Each arm 212, 214 can include a first arm portion 216, 218, a first elbow 220, 222, a second arm portion 224, 226, a second elbow 228, 230, and a sealing portions 232, 234. The first arm portion 216, 218 can angle away from the gasket base 202. For example, the first arm portion 216, 218 of each arm 212, 214 can extend axially away from the gasket base 202 and radially inward toward the gasket axis X-X. The first arm portion 216, 218 of each arm 212, 214 can extend to a corresponding first elbow 220, 222. Each first elbow 220, 222 can be defined by a first elbow radius R1, for example, which extends axially inward toward the central flange 204 and radially inward toward the gasket axis X-X, to the second arm portions 224, 226. The second arm portion 224, 226 of each arm 212, 214 can extend from the corresponding first elbow 220, 222 to a corresponding second elbow 228, 230.

The second arm portion 224, 226 can extend at an inward angle α relative to radial axis Y-Y. The radial axis Y-Y is perpendicular to the gasket axis X-X and extends to a tangent point on an outermost portion of the respective first arm 212 or second arm 214. An angle α can be defined from the radial axis Y-Y to surfaces 235, 237. The surfaces 235, 237 can extend between the first elbows 220, 222 and the second elbows 228, 230. The inward angle α can be greater than or equal to 1 degree and less than or equal to 40 degrees. The angle α can be greater than or equal to 2 degrees and less than or equal to 30 degrees. The angle α can be greater than or equal to 5 degrees and less than or equal to 25 degrees. The angle α can be greater than or equal to 10 degrees and less than or equal to 23 degrees. Each second elbow 228, 230 can be defined by a second elbow radius R2, for example, from the gasket axis X-X to the sealing portions 232, 234. The second elbow radius R2 can be different than the first elbow radius R1.

The sealing portions 232, 234 can each define a sealing surface 236, 238 which extends away from the second elbow 228, 230 toward the central flange 204. The sealing surfaces 236, 238 can be continuous with the surfaces 235, 237, while being oriented at a greater angle than the surfaces 235, 237 relative to the radial axis Y-Y. This can enable the surfaces 235, 237 to more easily receive pipes 112, 114 along the gasket axis X-X towards the sealing surfaces 236, 238. The sealing surfaces 236, 238 can extend at an angle β relative to the radial axis Y-Y towards the central flange 204. The angle β can be based on factors such as the length of the sealing surfaces 236, 238, maximum allowable flare of the pipes 112, 114, maximum diameter of the pipes 112, 114, and minimum diameter of the pipes 112, 114, so as to enable the sealing surfaces 236, 238 to receive pipes of maximum flare diameter while also not interfere with various other sizes of pipes. The angle β can be greater than or equal to 60 degrees and less than 90 degrees. The angle β can be greater than or equal to 70 degrees and less than or equal to 85 degrees. The angle β can be greater than or equal to 75 degrees and less than or equal to 83 degrees. The sealing surfaces 236, 238 can extend away from the first elbow 220, 222. Accordingly, both sealing surfaces 236, 238 can be considered coaxial about the gasket axis X-X. Each sealing surface 236, 238 can be lowered relative to the apex 210 of the central flange 204, therefore located further away from the gasket axis X-X than the apex 210 of the central flange 204. For example, the distance between the apex 210 of the central flange 204 and the sealing surface 236, 238 can be greater than or equal to 0.02 inches and less than or equal to 0.5 inches. The distance can be 0.084-0.122 inches (2.1336-3.0988 mm).

The sealing portions 232, 234 can extend axially toward the central flange 204. First surfaces 242, 244 defined by the sealing portions 232, 234 can extend perpendicular or substantially perpendicular from the sealing surface 236, 238. The first surfaces 242, 244 can be perpendicular to the gasket axis X-X. The curved inner wall 246, 248 can be defined by a curved inner wall radius R3. The curved inner wall radius R3 can be smaller than the first elbow radius R1, and/or the second elbow radius R2. The curved inner wall 246, 248 can extend directly from the first surfaces 242, 244. The curved inner wall 246, 248 can extend from a flat inner wall 250, 252. The flat inner wall 250, 252 can extend tangentially away from the curved inner wall 246, 248 to the first surfaces 242, 244. The curved inner wall 246, 248 can extend into the central flange 204. In some examples, fillets are formed between at least two of the flat inner walls 250, 252, the central flange 204, the first surfaces 242, 244, and the curved inner wall 246, 248 to create a smoothly curving, continuous surface. Together, the first surfaces 242, 244, the curved inner walls 246, 248, the flat inner walls 250, 252, and the central flange 204 define gasket cavities 258, 260 positioned on either side of the central flange 204. As explained below, the gasket cavities 258, 260 can allow compression and flexing of the arms 212, 214, which in turn promotes seal creation and easy movement about a pipe surface.

The geometry of the arms 212, 214 can depend on the size of the pipes 112, 114 the gasket 200 is intended to help seal. For example, an inner diameter D1 of the gasket 200 (measured as twice the distance from the sealing surface 236, 238 to the gasket axis X-X) can be approximately equal to the nominal outside diameter of the pipe 112, 114 that the gasket 200 is intended to seal. A first radius R4, measured as the distance from a furthest point from the base 202 of the sealing portions 232, 234 point to the gasket axis X-X is defined by the gasket 200. The first radius R4 can be used to accommodate for the possible pipe 112, 114 dimensional tolerances. In some examples, twice the first radius R4 is larger than the maximum allowable pipe nominal diameter, factoring in tolerances. The gasket 200 can also define a second radius R5. The second radius R5 is measured from a furthest point from the base 202 of the central flange 204 to the gasket axis X-X. In some examples, twice the second radius R5 is smaller than the pipe nominal diameter to limit movement of the pipe beyond the central flange. The first radius R4 may be larger than the second radius R5, to accept the pipe up to the second radius R5.

As depicted above, the size of the first elbow radius R1, the second elbow radius R2, and the curved inner wall radius R3 can all vary depending upon the size of the pipe coupling 100. The relative geometric relationship between each of the radii R1, R2, R3 allow the gasket 200 to be easily positioned upon and between pipes 112, 114. By having the first elbow radius R1 smaller than the second elbow radius R2, the gasket 200 can easily slide onto the outermost end 116, 118 of a pipe with minimal flexing or rolling. The smaller first elbow radius R1 allows for additional gasket thickness near the axial ends of the gasket 200 that, when compressed, extend laterally to create a more robust seal between the gasket 200 and the housing 120. The larger second radius R2 allows the gasket 200 to move along a pipe 112, 114 after the gasket 200 has already been received around the pipe 112, 114. The larger second elbow radius R2 can help the gasket 200 avoid snagging on the ends 116, 118 of the pipes 112, 114, for example, when the gasket 200 is being moved along the pipe 112, 114. Because the sealing portions 232, 234 are aligned radially inward from the gasket base 202, the sealing portions 232, 234 can be smaller (e.g., can be defined by a larger second elbow radius R2). When compressed (e.g., due to pressurization), pressure on the inner walls 250, 252 can push the sealing portions 232, 234 onto the pipes 112, 114 to facilitate sealing.

The geometry of the second arm portion 224, 226 relative to the radial axis Y-Y can facilitate easier coupling of the pipe 112 to the gasket 200. The inward angle α may facilitate greater and easier bending of the arm 212, 214 relative to the gasket axis X-X and the radial axis Y-Y than a gasket with the first arm portion 216, 218 or the second arm portion 224, 226 being parallel to radial axis Y-Y or angled outward relative to radial axis Y-Y and the central flange 204. Further the inward angle α may assist centering the pipe 112 on the gasket axis X-X and reduce force required to insert the pipe 112 into the gasket 200.

Figure 5:
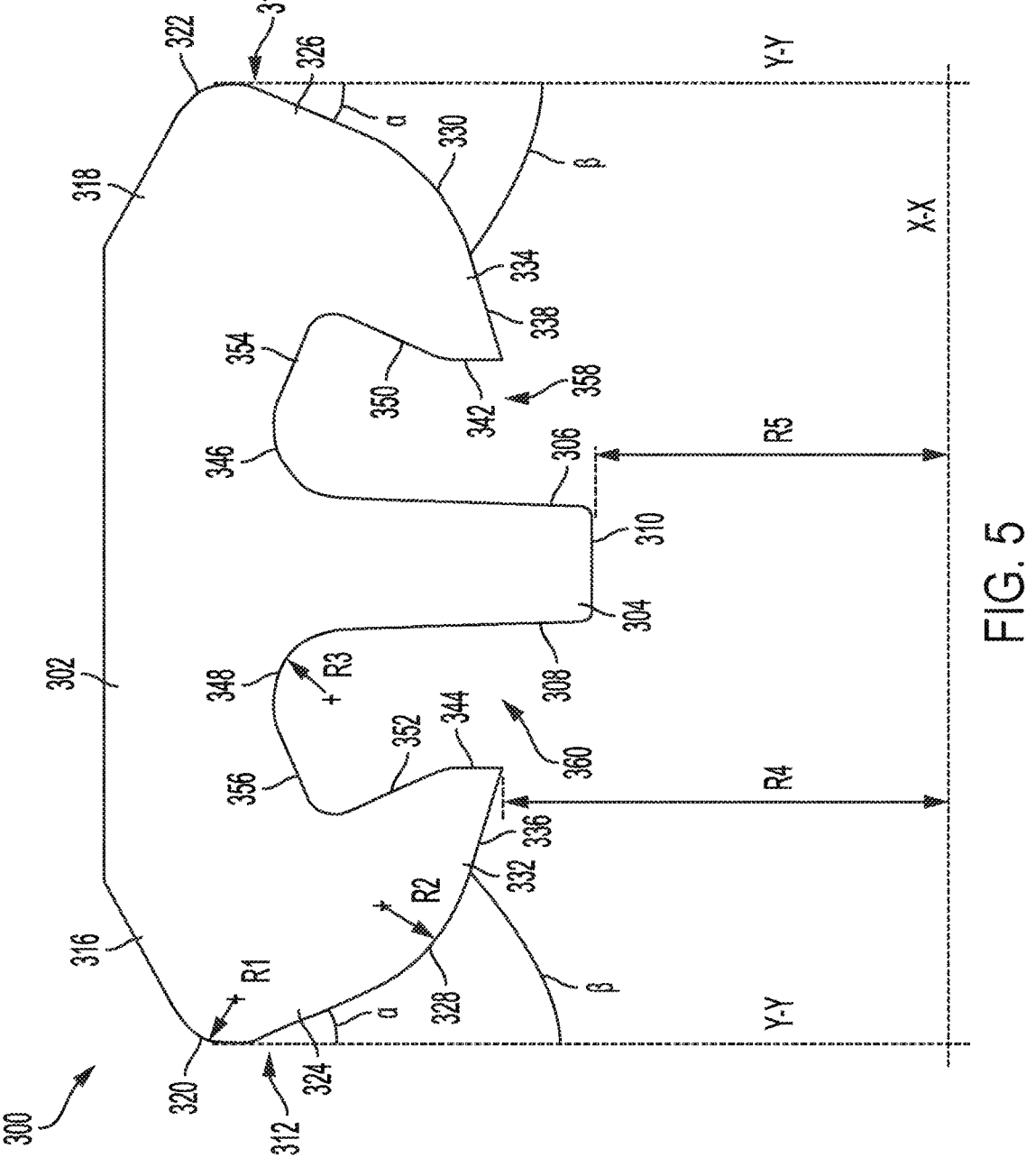
FIG. 5 is a cross-sectional view of a gasket for use with a pipe coupling.

FIG. 5 depicts a gasket 300. The gasket 300 includes the gasket base 302, the central flange 304 extending from the gasket base 302, and arms 312, 314 extending from the gasket base 302. The central flange 304 includes the first flange wall 306, the second flange wall 308, and the apex 310. Each arm 312, 314 includes the first arm portion 316, 318, the first elbow 320, 322, the second arm portion 324, 326, the second elbow 328, 330, the sealing portion 332, 334, the sealing surface 336, 338 (defining angle β), the first surface 342, 344, the curved inner wall 346, 348, and the flat inner wall 350, 352. Each arm also includes a second flat inner wall 354, 356. The second flat inner wall interfaces with the curved inner wall 346, 348, and the flat inner wall 350, 352. The second flat inner wall 354, 356 can be tangential to the curved inner wall 346, 348. The second flat inner wall 354, 356 can be perpendicular to the flat inner wall 350, 352. The second flat inner wall 354, 356 may allow bending of the first arm portion 316, 318 relative to the second arm portion 324, 326 and the gasket base 302. The geometry of the second arm portion 324, 326 relative to a radial axis Y-Y can facilitate easier coupling of the pipe 112 to the gasket 300. An inward angle α may facilitate more and easier bending of the arm 312, 314 relative to the gasket axis X-X and the radial axis Y-Y than a gasket with the first arm portion 316, 318 or the second arm portion 324, 326 being parallel to radial axis Y-Y or angled outward relative to radial axis Y-Y and the central flange 304.

Figure 6:
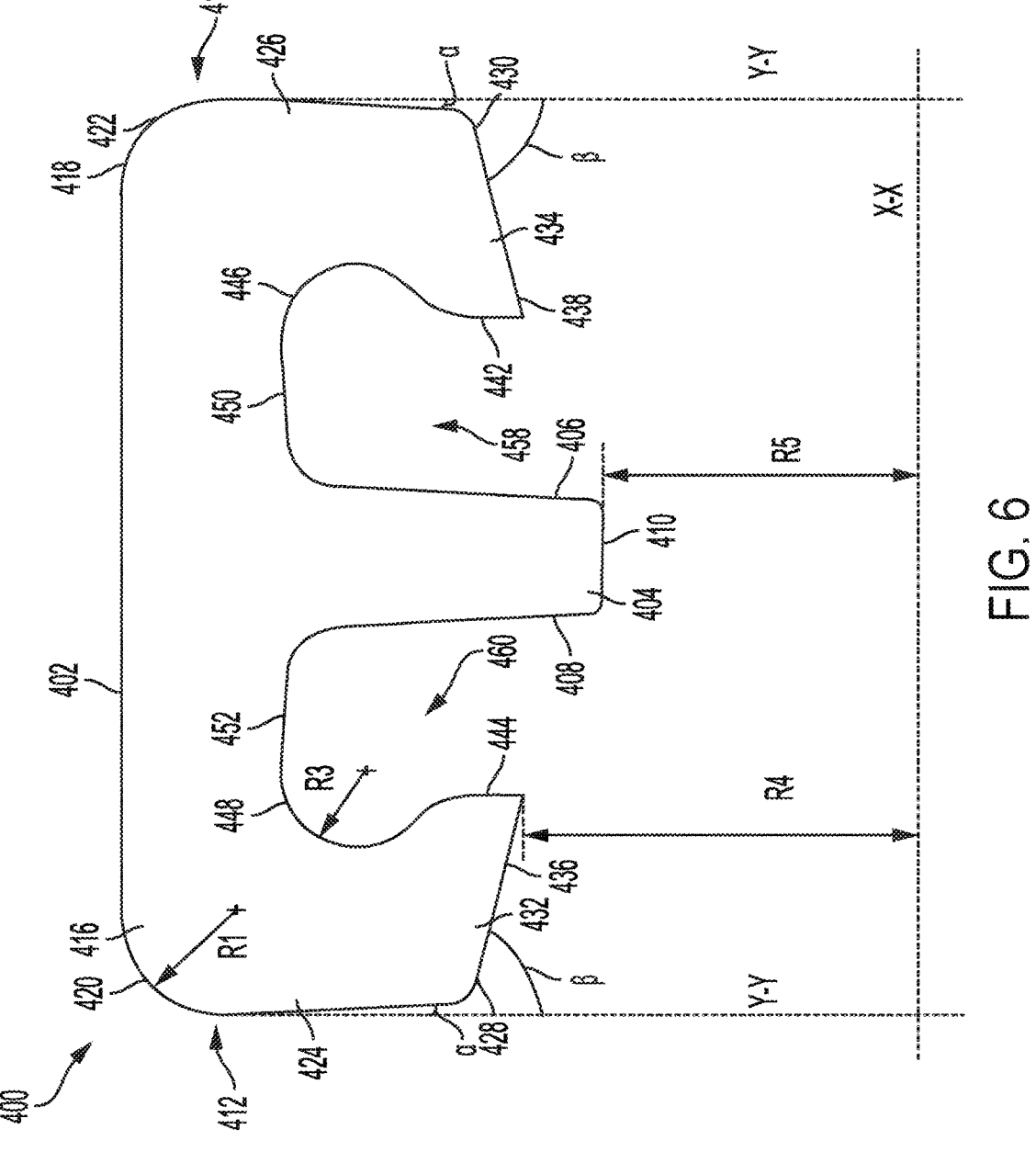
FIG. 6 is a cross-sectional view of a gasket for use with a pipe coupling.

FIG. 6 depicts a third gasket 400. The third gasket 400 includes the gasket base 402, the central flange 404 extending from the gasket base 402, and arms 412, 414 extending from the gasket base 402. The central flange 404 includes the first flange wall 406, the second flange wall 408, and the apex 410. Each arm 412, 414 includes the first arm portion 416, 418, the first elbow 420, 422, the sealing portion 432, 434, the sealing surface 436, 438 (defining angle β adjacent to second elbows 428, 430), the first surface 442, 444, and the curved inner wall 446, 448. The arms 412, 414 can include second arm portions 424, 426 extending from the first arm portions 416, 418. The first elbow radius R1 may be larger than the first elbow radius R1 in the gasket 200 and/or the gasket 300. The curved inner wall 446, 448 may interface with the first surface 442, 444, and a flat inner wall 450, 452. The flat inner wall 450, 452 can be tangential to the curved inner wall 446, 448 and interface with the first flange wall 406 and the second flange wall 408. The first arm portion 416, 418 can be parallel or substantially parallel to the first flange wall 406 and the second flange wall 408. The first arm portion 416, 418 may be angled inward at an inward angle α relative to a radial axis Y-Y. The radial axis Y-Y is perpendicular to the gasket axis X-X. The first arm portion 416, 418 can be perpendicular to the gasket base 402. The geometry of the first arm portion 416, 418 relative to the radial axis Y-Y can facilitate easier coupling of the pipe 112 to the gasket 400. An inward angle α may facilitate more and easier bending of the arm 412, 414 relative to the gasket axis X-X and the radial axis Y-Y than a gasket with the first portion 416, 418 being parallel to radial axis Y-Y or angled outward relative to radial axis Y-Y and the central flange 404. The angle α of the third gasket 400 can be greater than or equal to 1 degree and less than or equal to 10 degrees. The angle α can be greater than or equal to 2 degrees and less than or equal to 7 degrees.

Figure 7:
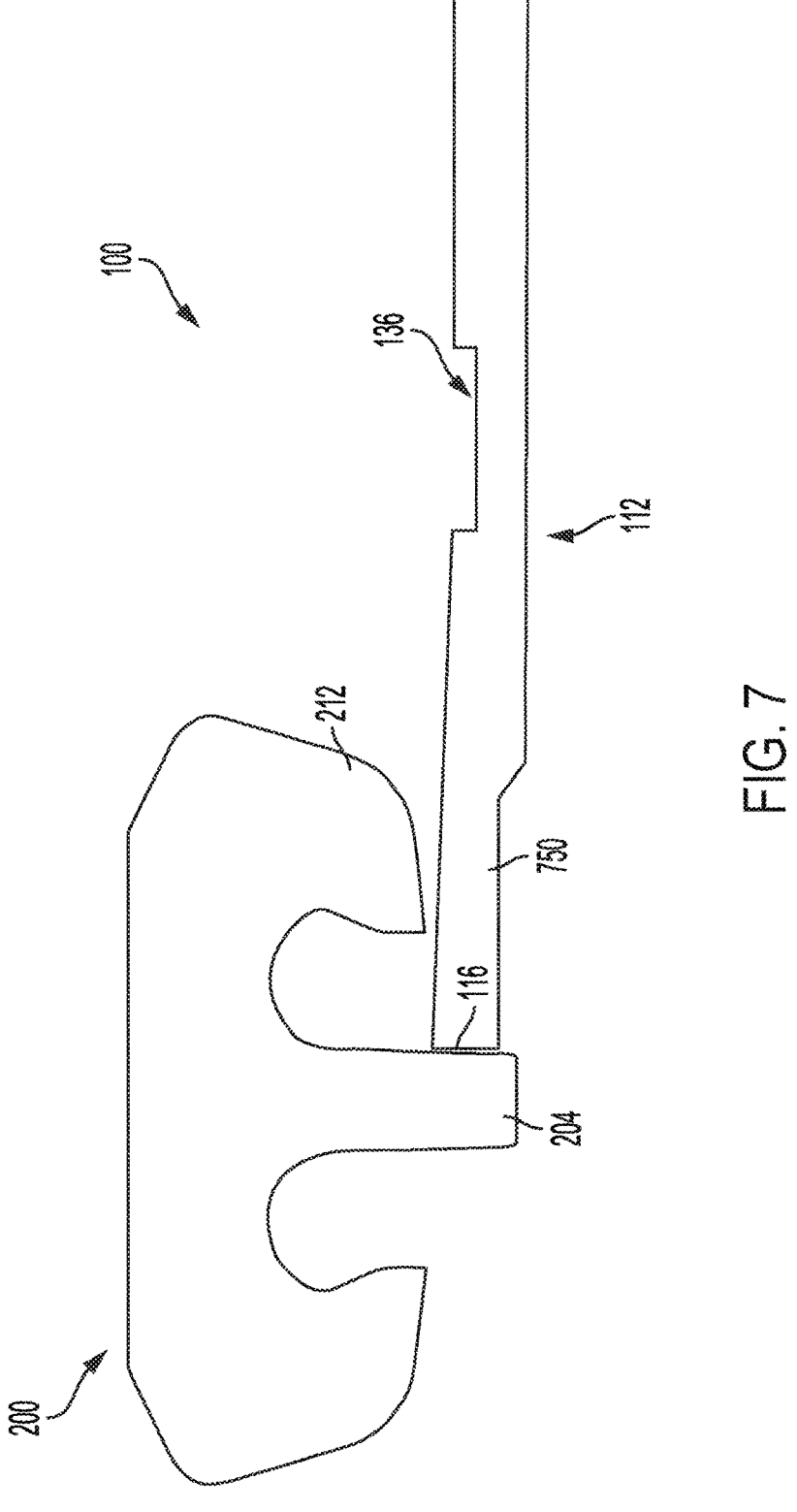
FIG. 7 is a cross-sectional view of a gasket and a pipe of a pipe coupling.

The above dimensions can enable methods of improved gasket installation and removal, such as depicted by FIG. 7 and with reference to FIG. 4. The gasket 200 (e.g., the gasket 300, the third gasket 400, etc.) can initially be fitted over the outer diameter of a pipe 112, 114. For example, a first radius R4 can be larger than the outer diameter of the pipe 112, 114 and a second radius R5 can be smaller than the outer diameter of the pipe 112, 114 to limit movement of the pipe 112, 114 past a specific portion (e.g., the central flange 204, etc.). As illustrated, the end 116 of the pipe 112 may have a flared section 750, which the gasket 200 may engage when being installed onto the pipe 112. The gasket 200 can be urged toward the pipe 112 (or vice versa) to install the gasket 200 onto the pipe 112. Because the outside gasket radius R4 is greater than the radius of the maximum flare condition in the flared section 750, the pipe end 116 can contact the gasket 200 in the sealing portions 232, 234. The engagement between the sealing portions 232, 234 and the pipe end 116 can occur on a portion of the sealing portions 232, 234, or on an entirety of the sealing portions 232, 234, which causes the arm 212 of the gasket 200 to flex inward slightly while simultaneously centering the pipe end 116 within the gasket 200 along the gasket axis X-X. The resilient nature of the gasket 200 allows the arm 212 of the gasket 200 to displace slightly while the pipe end 116 is passed through the gasket 200. In some examples, an assembly of the pipe 112, gasket 200, and housing 120 can be shipped or otherwise transported together to a jobsite to improve efficiency associated with installing or maintaining a piping system.

The gasket 200 (e.g., the gasket 300, the third gasket 400, etc.) geometry can enable the gasket 200 to be readily removed or otherwise moved upon the pipe 112 in the direction opposite to the gasket installation direction. Specifically, the geometry of the gasket facilitates bending of the arms 212, 214. The angle of the sealing portions 232, 234 allows for relatively easy installation of the pipe 112 into the gasket 200. The angle may also help center the pipe relative to the gasket axis X-X during installation. The inward angle α of the second arm portion 224, 226 relative to the radial axis Y-Y may facilitate easier bending of the arms 212, 214 towards the central flange 204. The gasket cavities 258, 260 allow flexing of the material of the gasket to facilitate movement of the arms 212, 214 relative to the central flange 204. The distance between the first surfaces 242, 244 and the first flange wall 206 and the second flange wall 208 of the central flange 204 allows for movement of the arms 212, 214 towards the central flange 204. The geometry of the gasket 200, such as the first radius R4 is larger than the outer diameter of the pipe 112, 114 and a second radius R5 is smaller than the outer diameter of the pipe 112, 114, the sealing portions 232, 234 being angled relative to the gasket axis X-X, and the curved inner wall 246, 248 results in a gasket 200 that can be conveniently centered and placed upon the pipe 112. The gasket 200 can be easily and quickly installed onto a pipe 112, 114 and can be readily positioned (e.g., centered, etc.) upon the pipe 112, 114 to eventually create a pipe coupling 100, for example.

Returning now to FIGS. 1, 3, and 7, a process for creating a pipe coupling 100 is illustrated. Initially, the gasket 200 (e.g., the gasket 300, the third gasket 400, etc.) can be received onto the pipe 112, as depicted in FIG. 7. The gasket 200 can be urged onto the outer diameter of the pipe 112. Next, a second pipe 114 can be positioned coaxially with the first pipe 112 and the gasket axis X-X. The central flange 204 is centered within the gap formed between the two axial ends 116, 118 of the pipes 112, 114, depicted in FIG. 3. The central flange 204 can extends beyond an outer surface of the pipes 112, 114. The axial ends 116, 118 contact the first flange wall 206 and the second flange wall 208 to form a seal between the pipes 112, 114. With each of the sealing surfaces 236, 238 of the gasket 200 contacting different pipes 112, 114, the housing 120 can be positioned around the gasket 200. The channel 148 of the housing 120 can surround the gasket base 202 and compress the gasket 200 inward to form a fluidic seal between the pipes 112, 114 when the housing 120 is fastened to the pipes 112, 114. The housing 120 can be positioned around the gasket 200, and the pipes 112, 114 can be inserted into the housing 120 and gasket 200; once the pipes 112, 114 are properly positioned, the fastener 154 can be tightened on the protrusion 152 to compress the gasket 200 to form a fluidic seal.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act, or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical, or other positioning or orientation descriptions include variations within +/−10% or +/−10 degrees of pure vertical, parallel, or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A gasket, comprising:
an annular gasket base extending circumferentially about a gasket axis;
a central flange extending from the gasket base towards the gasket axis;
a first arm comprising a first arm portion, a first elbow defined by a first radius, a second elbow defined by a second radius, and a second arm portion that extends from the first elbow to the second elbow, the first radius less than the second radius;

the first arm portion extends from the gasket base to a first radial axis that is perpendicular to the gasket axis, the second arm portion extends from the first elbow and tapers inward towards the central flange relative to the first radial axis, the second arm portion defining a first surface at a first angle relative to the first radial axis and a second surface at a second angle relative to the first radial axis, the second angle greater than the first angle, the second surface further from the first arm portion than the first surface; and a second arm comprising a third arm portion and a fourth arm portion, the third arm portion extends from the gasket base to a second radial axis that is perpendicular to the gasket axis, the fourth arm portion extends from the third arm portion and tapers inward towards the central flange relative to the second radial axis, the fourth arm portion defining a third surface at a third angle relative to the second radial axis and a fourth surface at a fourth angle relative to the second radial axis, the fourth angle greater than the first angle, the fourth surface further from the third arm portion than the third surface.

2. The gasket of claim 1, comprising:

the second arm portion tapers inwardly away from the first radial axis, and the fourth arm portion tapers inwardly away from the second radial axis.

3. The gasket of claim 1, comprising:

the first elbow is tangent to the first radial axis, the second arm portion extends from the first elbow inward from the first radial axis.

4. The gasket of claim 1, comprising:

a first gasket cavity defined by the central flange and the first arm, and a second gasket cavity defined by the central flange and the second arm.

5. The gasket of claim 1, comprising:

a first sealing surface of the first arm and a second sealing surface of the second arm are structured to center a pipe within the gasket.

6. The gasket of claim 1, comprising:

the central flange is structured to extend between a first pipe coupled with the first arm and a second pipe coupled with the second arm.

7. The gasket of claim 1, comprising:

the central flange extends radially and inwardly away from the gasket base toward the gasket axis, and the first arm and the second arm are spaced apart from the central flange and extend radially and inwardly away from the gasket base toward the gasket axis.

8. The gasket of claim 1, comprising:

a smallest distance between the central flange and at least one of the first arm and the second arm is greater than or equal to 0.05 inches and less than or equal to 0.5 inches.

9. The gasket of claim 1, comprising:

a distance between an apex surface of the central flange and at least one of a first sealing surface of the first arm and a second sealing surface of the second arm is greater than or equal to 0.02 inches and less than or equal to 0.5 inches.

10. A pipe coupling, comprising:

a housing defining a channel; and a gasket comprising, an annular gasket base extending circumferentially about a gasket axis;

a central flange extending from the gasket base towards the gasket axis;

a first arm comprising a first arm portion, a first elbow defined by a first radius, a second elbow defined by a second radius, and a second arm portion that extends from the first elbow to the second elbow, the first radius less than the second radius;

the first arm portion extends from the gasket base to a first radial axis that is perpendicular to the gasket axis, the second arm portion extends from the first elbow and inward towards the central flange relative to the first radial axis, the second arm portion defining a first surface at a first angle relative to the first radial axis and a second surface at a second angle relative to the first radial axis, the second angle greater than the first angle, the second surface further from the first arm portion than the first surface; and a second arm comprising a third arm portion and a fourth arm portion, the third arm portion extends from the gasket base to a second radial axis that is perpendicular to the gasket axis, the fourth arm portion extends from the third arm portion and inward towards the central flange relative to the second radial axis, the fourth arm portion defining a third surface at a third angle relative to the second radial axis and a fourth surface at a fourth angle relative to the second radial axis, the fourth angle greater than the first angle, the fourth surface further from the third arm portion than the third surface.

11. The pipe coupling of claim 10, comprising:

the housing and the gasket base are positioned coaxial about the gasket axis.

12. The pipe coupling of claim 10, comprising:

the housing has an annular body.

13. The pipe coupling of claim 10, comprising:

the housing includes a tiered inner wall.

14. The pipe coupling of claim 10, comprising:

an inner wall of the housing includes a first cylindrical groove engaging wall formed at a first axial end of the housing and a second cylindrical groove engaging wall formed at a second axial end of the housing opposite the first axial end.

15. The pipe coupling of claim 10, comprising:

an inner wall of the housing includes a first cylindrical groove engaging wall formed at a first axial end of the housing and a second cylindrical groove engaging wall formed at a second axial end of the housing opposite the first axial end and the first cylindrical engaging wall extends from the first axial end of the housing inward, toward the second axial end of the housing, and approximately parallel to the gasket axis.

16. The pipe coupling of claim 10, comprising:

the housing is formed of at least two metallic components, the at least two metallic components being removably coupled with one another.

17. The pipe coupling of claim 10, comprising:

the channel is formed between and axially spaced apart from a first housing axial end and a second housing axial end.

18. The pipe coupling of claim 10, comprising:

the channel is partially defined by a cylindrical surface positioned radially outward from an inner wall of the housing, the cylindrical surface being coaxial with the gasket base about the gasket axis.

19. The pipe coupling of claim 10, comprising:

the housing is partially defined by a tiered inner wall, the tiered inner wall having a first cylindrical groove engaging wall formed at a first housing axial end, a second cylindrical groove engaging wall formed at a second housing axial end, a first notch formed radially outward and axially inward from the first cylindrical groove engaging wall to define a first circumferential notch wall centered about the gasket axis, a second notch formed radially outward and axially inward from the second cylindrical groove engaging wall to define a second circumferential notch wall centered about the gasket axis, and the channel formed radially outward from each of the first circumferential notch wall and the second circumferential notch wall and axially between each of the first circumferential notch wall and the second circumferential notch wall.

20. A gasket, comprising:

an annular gasket base extending circumferentially about a gasket axis;

a first arm comprising a first arm portion, a first elbow defined by a first radius, a second elbow defined by a second radius, and a second arm portion that extends from the first elbow to the second elbow, the first radius less than the second radius;

the first arm portion extends from the gasket base to a first radial axis that is perpendicular to the gasket axis, the second arm portion extends from the first elbow and tapers inward from the first radial axis, the second arm portion defining a first surface at a first angle relative to the first radial axis and a second surface at a second angle relative to the first radial axis, the second angle greater than the first angle, the second surface further from the first arm portion than the first surface; and a second arm comprising a third arm portion and a fourth arm portion, the third arm portion extends from the gasket base to a second radial axis that is perpendicular to the gasket axis, the third arm portion extends from the second arm portion and tapers inward from the second radial axis, the fourth arm portion defining a third surface at a third angle relative to the second radial axis and a fourth surface at a fourth angle relative to the second radial axis, the fourth angle greater than the first angle, the fourth surface further from the third arm portion than the third surface.

* * * * *